I. A. BENEDICT & G. W. CUMMINGS.
EXCAVATOR.
No. 28,247.
Patented May 15, 1860.
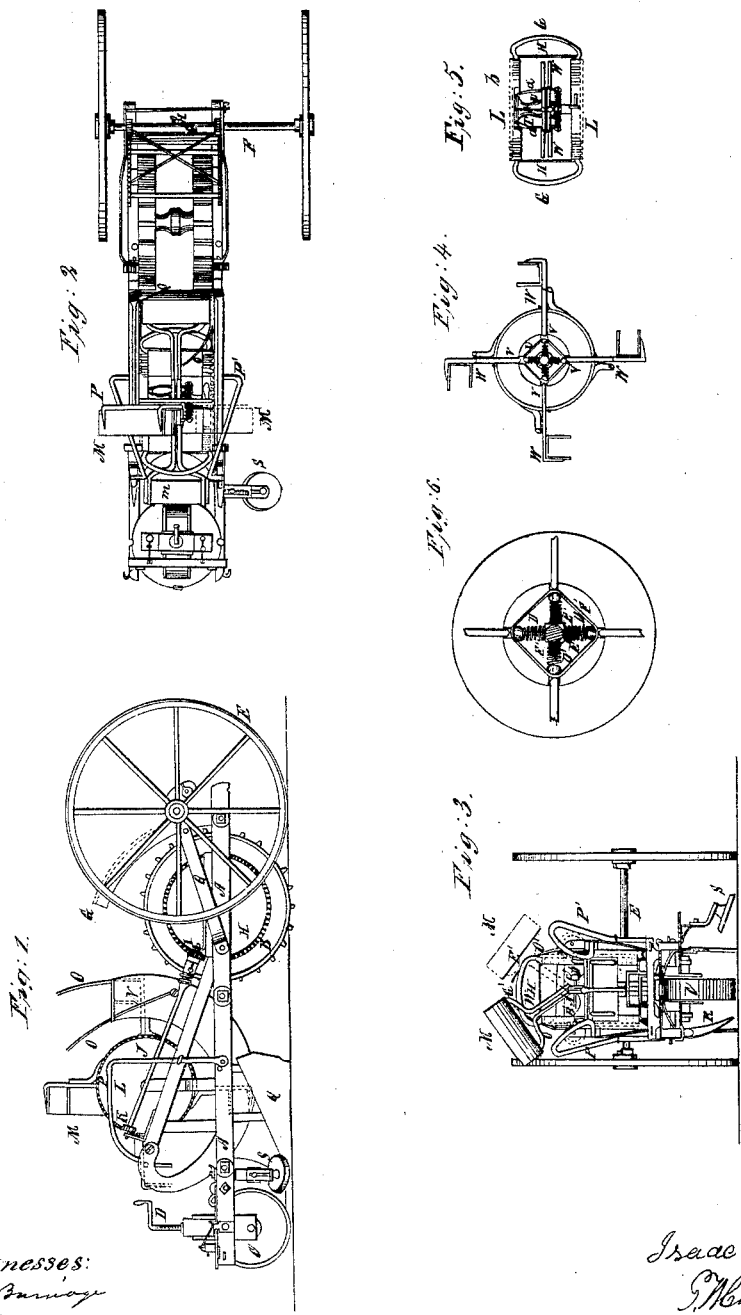
Witnesses:
W. H. Burrage
J. H. Burrage
Inventors
Isaac A. Benedict
G. W. Cummings

UNITED STATES PATENT OFFICE.

ISAAC A. BENEDICT, OF WEST SPRINGFIELD, PENNSYLVANIA, AND G. W. CUMMINGS, OF CONNEAUT, OHIO.

DITCHING-MACHINE.

Specification of Letters Patent No. 28,247, dated May 15, 1860.

*To all whom it may concern:*

Be it known that we, I. A. BENEDICT, of West Springfield, in the county of Erie and State of Pennsylvania, and G. W. CUM-MINGS, of Conneaut, in the county of Ashtabula and State of Ohio, have invented certain new and useful improvements in a machine for ditching and excavating, by the means of which the work is performed more effectively and expeditiously and hence much cheaper than in the ordinary way; and we do hereby declare the following to be a full and complete description of the same, reference being had to the accompanying drawings, forming a part of this specification, in which like letters refer to like parts in the different views presented.

Figure 1, a side elevation of the machine. Fig. 2, a top view of Fig. 1. Fig. 3, a front elevation or view. Figs. 4, 5, detached sections.

A, A, Fig. 1, is a strong frame mounted upon the two driving wheels, B, B, both being shown in Fig. 2. At the rear end of the machine, and supported in front by the caster wheel, C, which wheel also serves as a means of directing the machine in the line of its course, and regulated it by the lever and screw, D. As to the depth it may require to work the ditch and the amount of earth to be taken up by the plow-scraper.

The wheels, E, run on the outerside of the frame A, working upon a sliding shaft or axle, F, shown in Figs. 2, 3. The purpose of these wheels is to give steadiness to the machine by preventing it from bearing too much to one side or the other, it also being so arranged as to be raised above a certain line of the machine or fall below it by the segment gear, G. The shaft or axle is made to slide through the sleeve, G′, for the purpose of adjusting the wheels to the width of the ditch, they being required to run upon the surface of the ground in a line with the excavation. The axle is secured to the sleeve in any one place by the set-screw, H′.

The cog wheels, H, secured to the side of the driving wheels, B, working into the pinions, I, turns the shafts, J, at the farther end of which is secured the pinions, K, which matching into the cogs constituting the rim of the disk, L, causing the two disks to revolve together carrying around with them the excavating buckets, M, shown in Figs. 2, 3.

N, is a case inclosing and guiding the elevators and when loaded preventing the dirt from falling out in their ascent.

O and O′ are two deflecting rods fastened to the outside of the case, by the means of which the loaded buckets or elevators are gently tipped to one side of the machine and thereby made to discharge their contents.

P and P, are two side guides both being shown in Figs. 2, 3, by the means of which the buckets after having discharged their contents are again brought into a direct or vertical line as when they are while being filled or loaded.

Q, is a broad plow scraper extending across the frame and firmly secured to it immediately under the elevators, by which the earth is plowed or loosened up for the more direct action of the buckets, on one side of the scraper and a little in advance of the same is a colter R, shown in Fig. 3, for the purpose of cutting the turf or earth whereby the scraper can the more easily follow and perform its work. S, is a wheel placed in the position as shown in Fig. 3. It is so connected with the frame of the machine by the means of a slotted slide and set screw that it may be placed at any desired distance from the machine and at either side. It is also so arranged that it may be raised upward or downward to any desired height as the nature of the work may demand. The object of this wheel is to act as a gage by which the width of the ditch or the excavation is regulated and the work made of a uniform width throughout. This is effected by the wheel being made to run at the lower outer corner of the ditch. This wheel may be taken off when the machine is used in ordinary excavating or grading. The position of the elevators or buckets while in operation and their connection with the shaft, T, passing through and connecting the disks, L, are shown in Figs. 1, 2, 3. A side view of the same is shown in Fig. 4.

The manner of connecting the arms of the elevators to the shaft, T, is as follows: U, Figs. 4, 5 is a hub or collar upon the shaft, T. In the edge of the hub is cut a groove and at the four opposite points are cut transversely the slots, V. In these slots are secured the ends of the elevator arm, W, Fig. 4, by a wire passing along the groove in the hub, U, and through the ends of the arms. These slots allow the arms to which the buckets are attached and carried around, to oscillate from one side of the machine to the other, so that the elevators thereby may discharge their contents, passing through the slot, V, and under the ends of the arms, W. Connected with the hub or collar, U, are four levers, A', Fig. 3, one end being pivoted at B', to a hub or collar on the disk, the other ends of the lever terminating in an eye, C', through which four rods or guides, D', connected to the shaft are made to project; around these rods or guides is a coil spring, E'. The object of these springs is to allow the arms to yield or give to any obstruction that may be offered, without strain or breaking, and to be again brought into their places on the obstruction being removed or passed over. Thus by the action of the springs the arms are allowed to move in a right line from the obstruction and to return on the obstruction being passed over or removed.

Fig. 6 is an enlarged view of Fig. 4, showing more clearly the nature and position of the guide rods and springs with their immediate relation to the arms, W; F', a wire passing over the ends of the guide rods and thereby preventing the levers and springs from coming off.

G, Figs. 3, 5, are curved rods reaching across the machine from the disks, L, to the edges of which they are firmly secured. These rods act as stays or supports to the excavators against which they rest on their ascending, and the rods, H', secured in like manner to the edge of the disks, L, act as supports or stays to the excavating buckets while descending, through preventing any undue strain at the pointed connection with the hub or collar.

The peculiar manner by which the buckets are made to discharge their contents is as follows: The guide rods, O, O', Fig. 2, 3, are curved so as to incline and reach over the machine and being so connected with the case, N, by an eye and screw the guides may be moved forward or backward of the excavator or buckets, the guide, O, being brought forward toward the buckets and the guide, O', at the same time pushed back from and out of the way as seen in Figs. 1, 2, the arms on their ascending come in contact with the guide, O, and having as before mentioned a lateral movement, they are thereby easily turned to one side of the machine and the buckets made to discharge their contents on the opposite side of the machine upon which the guide rods are brought to act, as seen in Figs. 2, 3. Should it be required to discharge the dirt on the other side of the machine the guide, O, is pushed back and the guide, O', brought forward the arms then coming in contact with the guide O' the buckets are turned so as to discharge their contents upon the side opposite that before mentioned, the bucket, M, assuming on the opposite side the position as the bucket M', Fig. 3. The buckets being turned laterally by the guides, O', to the position seen in Fig. 3, for the purpose of discharging its contents it is moved back again into its vertical place in line with scraper and case by means of the guide P, as the arms of the buckets in revolving move a certain distance along the guide, P, the form and position of this guide is such that the buckets are caused to move from the position at, M, Fig. 2, to that seen at, m, Fig. 2, which is its proper position for taking up and discharging the dirt as before stated. The action of the guide P, is the same in moving the buckets when it is turned to M', by the guide O', as that before described in relation to the guides O, and P. Thus each bucket is consecutively turned to the right or left by the guides O, or O' as the case may be and the earth discharged, and each bucket in its order turned into its vertical place by the action of the guides P, and P'. Q' Q' Fig. 1, are two arms secured to the frame A, A, in such a manner as to allow of their being raised upward or downward and through the extreme or outer ends is made to pass the shaft F, Fig. 2, upon which the wheels E, E, revolve. The purpose of the arms is to hold the pinions R', R', in their working position to the segment gear, G, and assist in preventing any lateral motion, the bars, S', S', connecting the segment gears, act as stays or braces giving thereby strength to them in the character of a kind of frame work.

What we claim as our improvement and desire to secure by Letters Patent is—

1. The arrangement of the sleeve G, sliding shaft F, in combination with adjusting arms and segment gear and pinions in the manner and for the purpose described.

2. We claim the adjusting guides O, O', and guides P, P', in combination with the movable buckets M, when arranged and operating conjointly in the manner and for the purpose set forth.

3. We claim the springs and levers in combination with the revolving hinged buckets, M, in the manner and for the purpose specified.

ISAAC A. BENEDICT.
G. W. CUMMINGS.

Witnesses:
J. BRAINERD,
W. H. BURRIDGE.